UNITED STATES PATENT OFFICE.

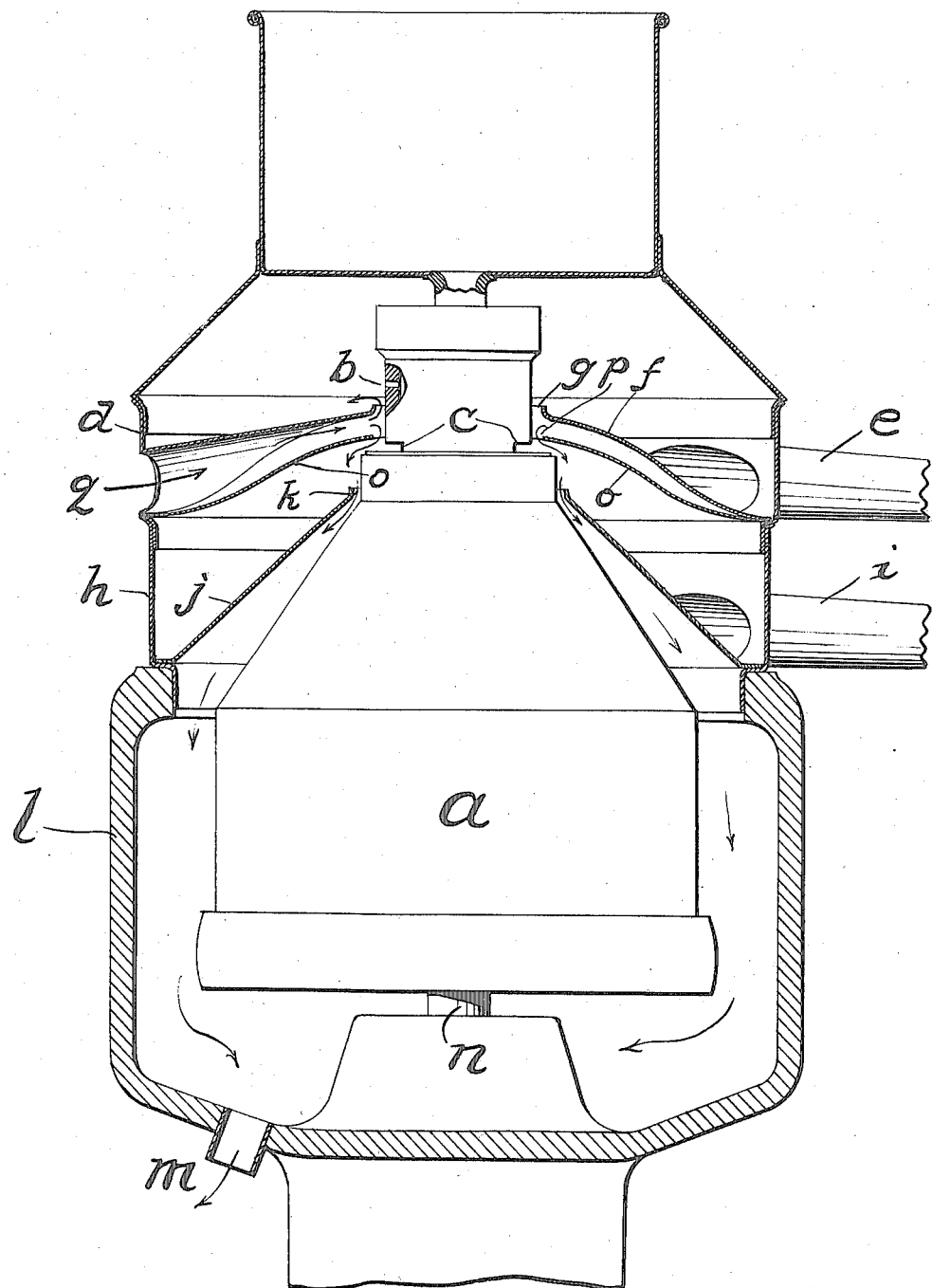

MEREDITH LEITCH, OF POUGHKEEPSIE, NEW YORK, ASSIGNOR TO THE DE LAVAL SEPARATOR COMPANY, OF NEW YORK, N. Y., A CORPORATION OF NEW JERSEY.

CENTRIFUGAL SEPARATOR.

1,263,439.  Specification of Letters Patent.  Patented Apr. 23, 1918.

Application filed August 2, 1917. Serial No. 184,125.

*To all whom it may concern:*

Be it known that I, MEREDITH LEITCH, a citizen of the United States, residing at Poughkeepsie, county of Dutchess, and State of New York, have invented a new and useful Improvement in Centrifugal Separators, of which the following is a full, clear, and exact description, reference being had to the accompanying drawings, which form a part of this specification.

My invention relates to improvements in centrifugal separators and particularly to the members which receive the discharged separated constituents from the rotary separating bowl In centrifugal separators for milk, the members which receive the cream and skim milk, after they escape from the separating bowl, are ordinarily called the cream cover and the skim milk cover, the lower parts of these covers being called respectively the cream hopper and the skim milk hopper. In the usual construction of these members there is a narrow clearance between the inner edge of each of these hoppers and the upper part of the bowl. In spite of the bowl being as smooth as possible it has considerable fan effect and draws air down through these clearances and expels it through the drain tube and through the space around the top bearing of the bowl. The large spray of milk from the skim milk outlet of the bowl acts as an inspirator and forces air out through the skim milk spout. The air for both these discharges is drawn in through the cream spout and passes in a strong draft down through the clearance between the bowl neck and the inner edge of the cream hopper. This strong draft tends to draw with it some of the cream, which is then caught with the skim milk and wasted.

The object of my invention is to prevent this draft and so provide a more efficient machine.

In the accompanying drawing the figure is a vertical sectional view of a cream separator embodying my invention.

$a$ is the separator bowl having a cream outlet at $b$ and skim milk outlets at $c$. $d$ is a cream cover with the spout $e$ and having its bottom formed by the hopper $f$ with a small clearance at $g$ from the neck of the bowl. The skim milk cover $h$ with the spout $i$ has for its bottom the hopper $j$ with a small clearance at $k$ from the upper part of the bowl. The frame of the machine has a bowl casing $l$ within which the bowl $a$ revolves and from which the drip tube $m$ leads. The bowl is supported and driven by the shaft $n$ revolving in a spring supported bearing, not shown, around which there is necessarily considerable clearance.

Below the hopper $f$, and high enough to have the skim milk, from the outlets $c$, pass under it, is a disk $o$ with a small clearance at $p$ from the bowl neck. The hopper $f$ is shaped, throughout a sector of any desired dimensions, to afford a relatively wide space between it and the disk $o$ and provide a free air inlet passage $q$ to the space between hopper $f$ and disk $o$ as shown on the left hand side of the figure.

Except for the addition of the disk $o$ and the shaping of the hopper $f$ of the cream cover $d$, the drawing is illustrative of a cream separator of the prior art.

With the ordinary construction, wherein there is no disk $o$ and wherein the cover $d$ and its hopper $f$ have throughout substantially the shape and location shown on the right hand side of the figure, the bowl, acting as a fan due to its very high speed of rotation, establishes a flow of air through the spout $e$ into the cream receiving chamber and thence down through the clearances at $g$ and $k$, the air being expelled mainly through the drip tube $m$ and partly through the clearance around the bearing. The jets of skim milk from the outlets $c$ drive a portion of the down-flowing air out through the skim milk spout $i$. In my improved construction, the entering air all comes in through the passage $q$ and, passing between the cream receiving chamber and the milk receiving chamber, flows mainly down through the clearance $p$ into the milk receiving chamber. Thence part of the air passes out the spout $i$ and part passes down through the clearance $k$ into the space between the bowl and its cover. A relatively small part of the air entering the passage $q$ flows upward through the clearance at $g$ and outward through the cream spout at $e$.

In the description and claims I have, for brevity, used the terms "cream" and "skim" milk as synonymous with the terms "lighter constituent" and "heavier constituent". The invention is, of course, applicable to a centrifugal separator for any liquids.

Having now fully described my inven- tion, what I desire to claim and protect by Letters Patent is:

1. In a centrifugal separator, the combination with a revoluble separator bowl provided with skim milk and cream discharge outlets, of a cream cover and a skim milk cover arranged around the upper part of the bowl and having clearances between their inner edges and the upper part of the bowl, discharge spouts communicating with the chambers formed by said covers, and means to establish, in the rotation of the bowl, a current of air upwardly through the clearance between the cream cover and the bowl, thereby reversing the direction of the usual air current flow and preventing any admixture between the separated cream and the separated skim milk.

2. In a centrifugal separator, the combination with a revoluble separator bowl having skim milk and cream discharge outlets, of a cream cover and a skim milk cover forming adjacent cream receiving and skim milk receiving chambers, and means independent of the cream receiving chamber to supply air to the skim milk receiving chamber.

3. In a centrifugal separator, the combination with a revoluble bowl having skim milk and cream discharge outlets, of a cream receiving chamber communicating with the cream outlet, a skim milk receiving chamber communicating with the skim milk outlet, and a chamber open to the atmosphere and arranged between the cream receiving chamber and the skim milk receiving chamber and adapted, in the rotation of the bowl, to supply air to both of them.

4. In a centrifugal separator, the combination with a revoluble bowl having skim milk and cream discharge outlets, of a cream cover including a hopper having a clearance between its inner edge and the upper part of the bowl, a skim milk cover including a hopper having a clearance between its inner edge and the upper part of the bowl, and a disk between the covers and spaced from both hoppers and affording between the disk and the hopper of the cream cover a space for the admission of air in the rotation of the bowl.

5. In a centrifugal separator, the combination with a revoluble separator bowl having skim milk and cream discharge outlets, of a stationary bowl casing having an outlet and surrounding the bowl and spaced therefrom to form a bowl chamber, and covers arranged to form a cream receiving chamber and a skim milk receiving chamber, the arrangement being such as to tend, in the rotation of the bowl, to discharge air from the bowl chamber and one of the other chambers, and means independent of the third chamber to supply air for said discharge.

In testimony of which invention, I have hereunto set my hand at Poughkeepsie, N. Y., on this 21st day of July, 1917.

MEREDITH LEITCH.